(12) United States Patent
Moran et al.

(10) Patent No.: US 7,444,830 B2
(45) Date of Patent: Nov. 4, 2008

(54) AIRCRAFT GALLEY CARTS AND OTHER INSULATED FOOD STORAGE UNITS, AND METHODS FOR THEIR USE

(75) Inventors: Thomas J. Moran, Seattle, WA (US); John C. Rood, Seattle, WA (US)

(73) Assignee: The Boeing Company, Chicago, IL (US)

( * ) Notice: Subject to any disclaimer, the term of this patent is extended or adjusted under 35 U.S.C. 154(b) by 426 days.

(21) Appl. No.: 10/795,738

(22) Filed: Mar. 8, 2004

(65) Prior Publication Data
US 2005/0193760 A1 Sep. 8, 2005

(51) Int. Cl.
F25D 3/08 (2006.01)

(52) U.S. Cl. ............................. 62/371; 62/457.2; 62/530

(58) Field of Classification Search ................ 62/371, 62/246, 530, 457.2, 440, 457.6; 312/296, 312/401, 405, 405.1, 408, 406.2; 49/91.1, 49/355, 383, 475.1
See application file for complete search history.

(56) References Cited

U.S. PATENT DOCUMENTS

| | | | |
|---|---|---|---|
| 2,489,493 A | 11/1949 | Kuenzie | |
| 2,939,811 A | 6/1960 | Dillon | |
| 3,085,842 A | 4/1963 | Johnson | |
| 3,205,033 A | 9/1965 | Stentz | |
| 3,297,373 A | 1/1967 | Andrews et al. | |
| 3,542,444 A | 11/1970 | Webb et al. | |
| 3,698,588 A | 10/1972 | Pogorski | |
| 3,823,972 A | 7/1974 | Ramer | |
| 3,847,250 A | 11/1974 | Sherrill | |
| 3,847,458 A | 11/1974 | Nowak | |
| 3,850,714 A | 11/1974 | Adorjan | |
| 3,853,367 A | 12/1974 | Jamison et al. | |
| 3,864,170 A | 2/1975 | Krieger | |
| 3,877,744 A | 4/1975 | Miller | |
| 3,948,347 A | 4/1976 | Rutledge | |
| 4,047,351 A | 9/1977 | Derner et al. | |
| 4,155,611 A | 5/1979 | Brekke et al. | |
| 4,172,915 A | 10/1979 | Sheptak et al. | |
| 4,210,070 A | 7/1980 | Tatum et al. | |
| 4,214,418 A | 7/1980 | Smith | |
| 4,284,674 A | 8/1981 | Sheptak | |
| 4,340,630 A | 7/1982 | Doty | |

(Continued)

OTHER PUBLICATIONS

U.S. Appl. NO. 10/731,695, filed Jun. 9, 2005, McAvoy.

(Continued)

*Primary Examiner*—Mohammad M Ali
(74) *Attorney, Agent, or Firm*—Perkins Coie LLP

(57) ABSTRACT

Aircraft galley carts and other insulated food storage units are disclosed herein. In one embodiment, a food storage unit configured in accordance with the invention includes an interior portion configured to hold food, a first panel positioned at least proximate to a wall of the interior portion, and at least a second panel positioned at least proximate to the first panel. In this embodiment, the first panel can include a phase change material and at least a portion of the second panel can be evacuated. In one aspect of this embodiment, the food storage unit can further include a temperature sensor operably coupled to the interior portion. The temperature sensor can be configured to provide an indication when the temperature in the interior portion reaches a preselected temperature.

39 Claims, 5 Drawing Sheets

U.S. PATENT DOCUMENTS

| | | | |
|---|---|---|---|
| 4,346,756 A | 8/1982 | Dodd et al. | |
| 4,433,517 A | 2/1984 | Moore, Jr. | |
| 4,444,821 A | 4/1984 | Young et al. | |
| 4,579,756 A | 4/1986 | Edgel | |
| 4,696,954 A | 9/1987 | Pritchard et al. | |
| 4,730,748 A | 3/1988 | Bane | |
| 4,775,002 A | 10/1988 | Iwamoto | |
| 4,821,914 A * | 4/1989 | Owen et al. | 220/592.21 |
| 4,936,377 A | 6/1990 | DeVogel et al. | |
| 5,007,226 A | 4/1991 | Nelson | |
| 5,106,173 A | 4/1992 | Kelley et al. | |
| 5,115,602 A | 5/1992 | de Larrard | |
| 5,123,564 A | 6/1992 | Hobson | |
| 5,159,973 A * | 11/1992 | Pennington et al. | 165/48.1 |
| 5,194,482 A | 3/1993 | Chundury et al. | |
| 5,344,030 A | 9/1994 | Evenson | |
| 5,345,814 A | 9/1994 | Cur et al. | |
| 5,347,827 A * | 9/1994 | Rudick et al. | 62/440 |
| 5,368,380 A | 11/1994 | Mottmiller et al. | |
| 5,390,834 A | 2/1995 | Bitter et al. | |
| 5,392,960 A * | 2/1995 | Kendt et al. | 222/129.1 |
| 5,404,935 A | 4/1995 | Liebermann | |
| 5,407,074 A | 4/1995 | Brightbill et al. | |
| 5,433,518 A | 7/1995 | Skov | |
| 5,441,170 A | 8/1995 | Bane, III | |
| 5,454,427 A | 10/1995 | Westbrooks et al. | |
| 5,522,216 A * | 6/1996 | Park et al. | 62/3.6 |
| 5,570,588 A * | 11/1996 | Lowe | 62/457.7 |
| 5,605,344 A | 2/1997 | Insalaco et al. | |
| 5,628,241 A | 5/1997 | Chavanaz et al. | |
| 5,637,933 A | 6/1997 | Rawlings et al. | |
| 5,664,396 A | 9/1997 | Lyman et al. | |
| 5,688,031 A | 11/1997 | Tryon | |
| 5,936,318 A | 8/1999 | Weiler et al. | |
| 5,979,693 A | 11/1999 | Bane, III | |
| 6,034,355 A | 3/2000 | Naderi et al. | |
| 6,038,830 A | 3/2000 | Hirath et al. | |
| 6,109,057 A * | 8/2000 | Shervington et al. | 62/371 |
| 6,131,404 A * | 10/2000 | Hase et al. | 62/384 |
| 6,192,703 B1 * | 2/2001 | Salyer et al. | 62/457.7 |
| 6,234,498 B1 | 5/2001 | Saku et al. | |
| 6,260,377 B1 | 7/2001 | Tamaoki | |
| 6,295,829 B1 * | 10/2001 | Gibot | 62/371 |
| 6,408,841 B1 | 6/2002 | Hirath et al. | |
| 6,460,952 B1 | 10/2002 | Tryon | |
| 6,476,519 B1 | 11/2002 | Weiner | |
| 6,483,204 B2 | 11/2002 | Hanaki | |
| 6,664,656 B2 | 12/2003 | Bernier | |
| 6,672,601 B1 | 1/2004 | Hofheins et al. | |
| 6,695,325 B2 | 2/2004 | Carrillo | |
| 6,778,414 B2 | 8/2004 | Chang et al. | |
| 6,935,641 B2 | 8/2005 | Hahn | |
| 2002/0088244 A1 * | 7/2002 | Jennings et al. | 62/371 |
| 2002/0116936 A1 * | 8/2002 | Cartwright et al. | 62/157 |
| 2003/0082357 A1 * | 5/2003 | Gokay et al. | 428/212 |
| 2003/0182043 A1 | 9/2003 | Christiansen et al. | |
| 2004/0207168 A1 * | 10/2004 | Raab et al. | 280/79.2 |

OTHER PUBLICATIONS

DeKalb Molded Plastics, Structural Foam, 3 pgs, http://www.dekalbplastics.com/structural.html; accessed Feb. 25, 2004.

Frank, Franz et al., "Systems Development for The More Electronic Aircraft", Aerospace Congress & Exhibition, Sep. 10-14, 2001, Airbus, 19 pgs.

Hardigg Industries, "How Rotomolding Technology Works," 3 pgs, http://www.harding.com/about_hardigg/rotomolding.html; accessed Feb. 26, 2004.

Knobe, B. et al., "Definition of Standard Interfaces for Galley Insert Equipment—Gain", ARINC/AEEC Gain Specification Issue 2, Nov. 19, 2003, 55 pgs.

Knobe, B. et al., "Definition of Standard Interfaces for Galley Insert Equipment—Gain", Preliminary ARINC 628 Part 5 Strawman, Aug. 21, 2003, 49 pgs.

TecRep Engineering, Thermoplastic-structural foam molding, 2 pgs, http://www.tecrep.com/thermoplastic_strucfoam.asp; accessed Feb. 25, 2004.

Aspen Aerogels, Inc., "Products—Aspen Aerogels Offers a Range of Flexible Aerogel Blanket Mat," Nov. 25, 2003, www.aspenaerogels.com/products.htm <http://www.aspenaerogels.com/products.htm>, (1 Page).

Aspen Aerogels, Inc., "Technology—Aerogels are Extraordinary Solid Insulators," Nov. 25, 2003, www.aspenaerogels.com/technolgy2.htm <http://www.aspenaerogels.com/technolgy2.htm>, (3 Pages).

Sanyo Patented VIP Vacuum Insulation Panel, http://www.sanyobiomedical.com/products/vip.php [accessed Nov. 21, 2003] (2 pgs).

Excelfrax 200 VIP Insulation, http://www.unifrax.com [accessed Nov. 21, 2003] (2 pgs).

Phase Change Materials, http://web.mit.edu/3.082/www/team2_s02/phase_change.html; [accessed Jan. 9, 2004] (1 pg).

Full Size Inflight Service Cart, Driessen Aircraft Interior Systems, The Netherlands [date unknown] (2 pgs).

* cited by examiner

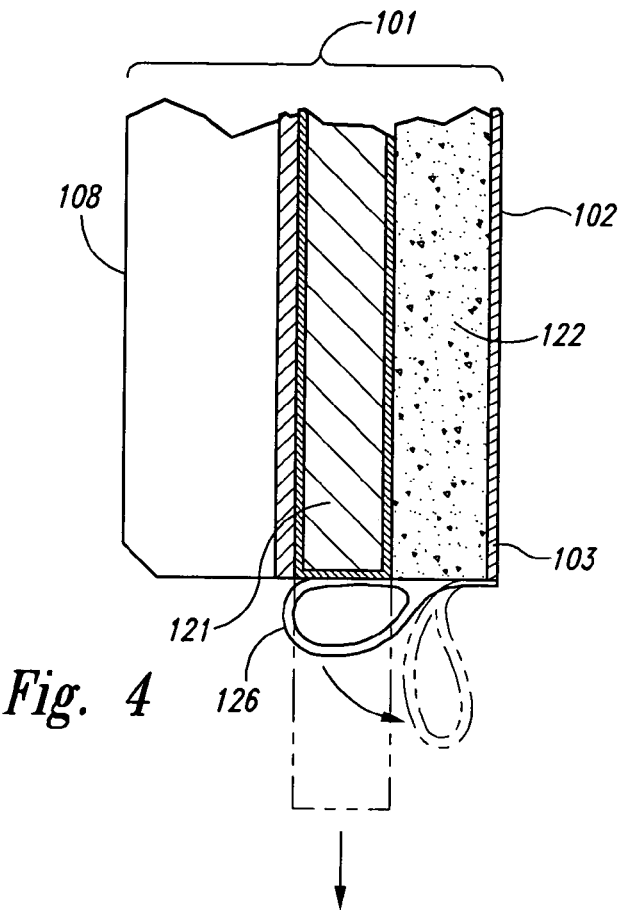
*Fig. 4*
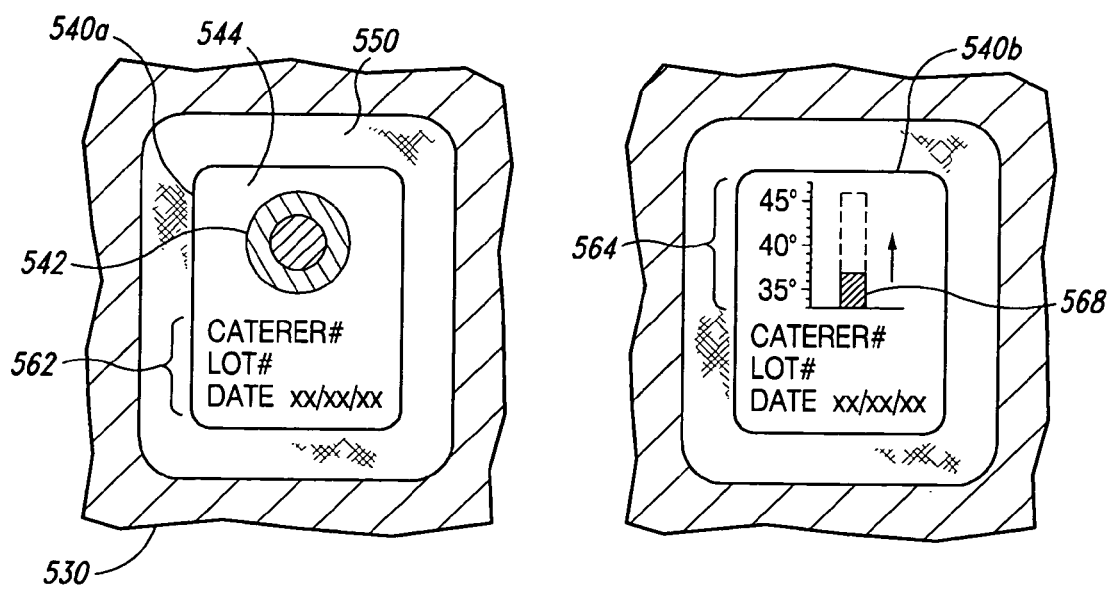
*Fig. 5A*   *Fig. 5B*

AIRCRAFT GALLEY CARTS AND OTHER INSULATED FOOD STORAGE UNITS, AND METHODS FOR THEIR USE

TECHNICAL FIELD

The following disclosure is directed generally to insulated food storage units and, more particularly, to insulated galley carts for use with aircraft.

BACKGROUND

Airline meals are typically prepared in advance by caterers. In one approach, a caterer prepares a large quantity of individual meals and stores them in a refrigeration locker. The refrigeration locker is typically kept at a temperature between 35° F. and 40° F. because the United States Public Health Service (USPHS) requires that airlines not serve food whose temperature has risen above 45° F. In preparation for a flight, the caterer takes the required quantity of meals out of the locker and places them in aircraft galley carts. Alternatively, the meals could be placed in the galley carts prior to storage in the refrigeration locker. The caterer then transports the galley carts to the aircraft and loads them into a galley.

Airline operators typically use one of two methods to keep the meals below the maximum allowable 45° F. while they are stored in the aircraft galley. Both of these methods utilize a galley chilled-air refrigeration system. The first method uses an "air-over" approach to flow chilled air from the aircraft refrigeration system over and around the galley carts when they are stored in the galley. The second method uses an "air-through" approach to flow chilled air from the aircraft refrigeration system through each of the individual galley carts in the aircraft galley.

One shortcoming associated with the conventional food chilling methods is that the galley chilled-air refrigeration system draws a significant amount of electrical power from the aircraft power system. Another shortcoming of these methods is that the galley chilled-air refrigeration system increases the cost and weight of the aircraft. A further shortcoming of these methods is that they lack a means for ensuring that the meals have not exceeded the 45° F. maximum allowable temperature set by the USPHS.

SUMMARY

The present invention is directed generally toward aircraft galley carts and other insulated food storage units. A food storage unit configured in accordance with one aspect of the invention includes an interior portion configured to hold food, a first panel positioned at least proximate to a wall of the interior portion, and at least a second panel positioned at least proximate to the first panel. In one aspect of the invention, the first panel can include a phase change material configured to undergo a phase transition at an at least approximately constant temperature. In another aspect of the invention, the second panel can include a core portion in an evacuated envelope.

A mobile food cart configured in accordance with another aspect of the invention can include an outer shell having an interior portion configured to hold food. The mobile food cart can further include at least a first wheel movably supporting the outer shell, and a temperature sensor positioned at least proximate to the outer shell and operably coupled to the interior portion. The temperature sensor can be configured to provide an indication when the temperature in the interior portion reaches a preselected temperature. In another aspect of the invention, the mobile food cart can further include a food support structure positioned within the interior portion of the outer shell. The food support structure can include a plurality of horizontal supports configured to support food trays in a vertical arrangement.

A method for storing food in accordance with a further aspect of the invention includes reducing the temperature of a phase change material to at least partially transition the phase change material from a first state to a second state. The method can further include installing the phase change material in a food storage unit at least proximate to an evacuated panel. The method can additionally include placing food in the food storage unit at least proximate to the phase change material.

BRIEF DESCRIPTION OF THE DRAWINGS

FIG. 4 is an enlarged cross-sectional view illustrating a method of removing a panel from a body of the food storage unit of FIG. 1, in accordance with an embodiment of the invention.

FIGS. 5A and 5B are enlarged front views of temperature information units configured in accordance with embodiments of the invention for use with food storage units, such as the food storage unit of FIG. 1.

DETAILED DESCRIPTION

The following disclosure describes aircraft galley carts and other insulated food storage units, and methods for their use. Certain details are set forth in the following description and in FIGS. 1-7 to provide a thorough understanding of various embodiments of the invention. Other details describing well-known structures and systems often associated with aircraft galley carts and insulated food storage units are not set forth in the following disclosure to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, angles, and features without departing from the spirit or scope of the present invention. In addition, further embodiments of the invention may be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

Figure 1:
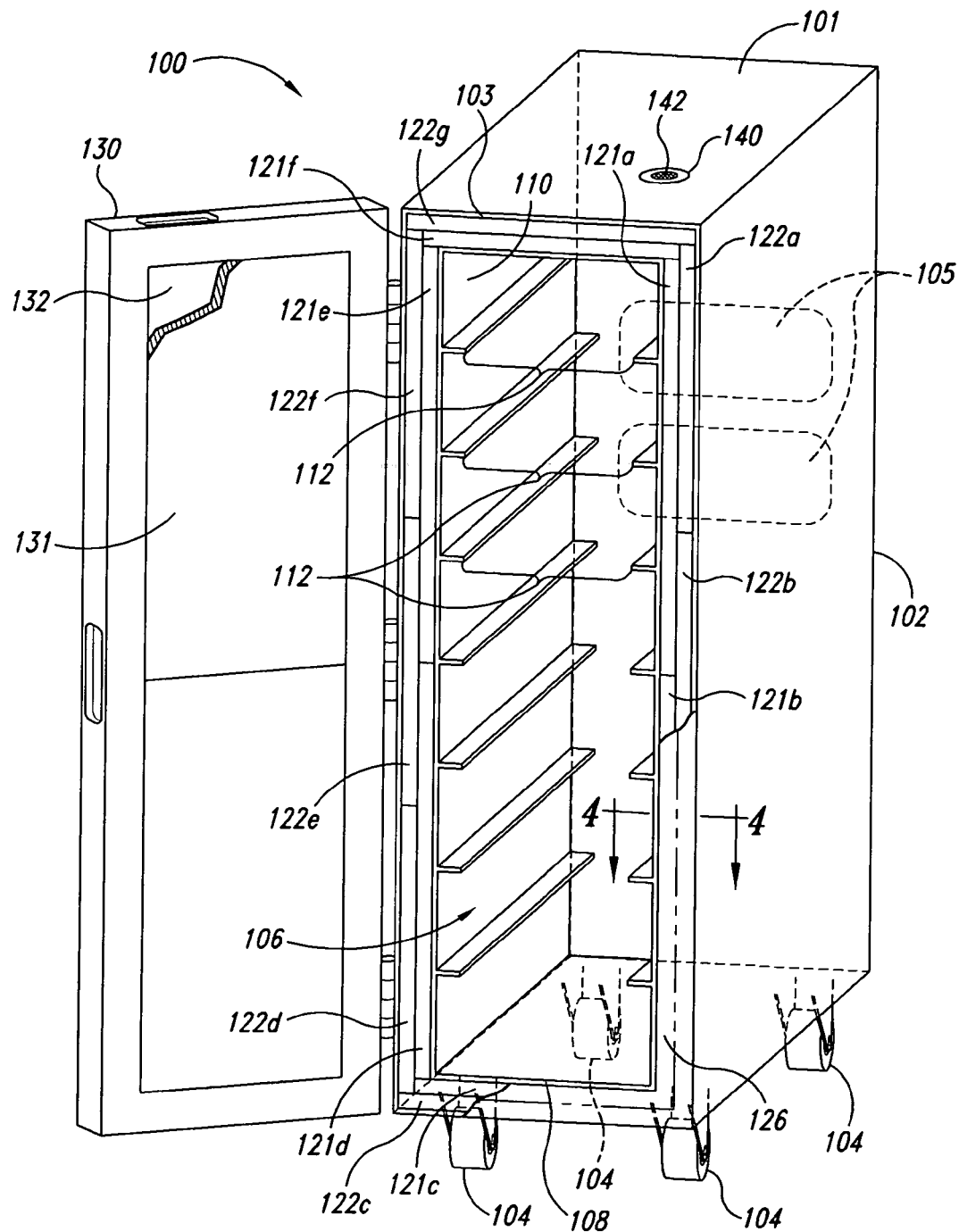
FIG. 1 is a partially cut away, partially hidden isometric view of a food storage unit configured in accordance with an embodiment of the invention.

FIG. 1 is a partially cutaway, partially hidden isometric view of a food storage unit 100 configured in accordance with an embodiment of the invention. In one aspect of this embodiment, the food storage unit 100 includes a body 101 having an outer shell 102 and an interior portion 106. The body 101 can be movably supported by a plurality of wheels 104 attached toward a bottom portion of the outer shell 102. In one embodiment, the body 101 can be sized to fit between adjacent passenger seat sections in a passenger aisle on an aircraft. In this embodiment, the wheels 104 facilitate movement of the food storage unit 100 in the passenger aisle. The outer shell 102 can include a flow interface 105 configured to circulate cold air from a galley refrigeration system through the interior portion 106 if such cooling is desired for certain embodiments. The outer shell 102 can also include at least one aperture 103 configured to provide access to the interior portion 106.

The interior portion 106 can include a food support structure 108 configured to hold food (not shown). In the illustrated embodiment, the food support structure 108 includes a plurality of tray supports 112 extending horizontally along an inner shell 110. Each pair of opposing tray supports 112 can be configured to support a plurality of individual airline meals (not shown).

In another aspect of this embodiment, the body 101 further includes a plurality of first panels 121 (identified individually as first panels 121a-121f) removably positioned at least proximate to the inner shell 110, and a plurality of second panels 122 (identified individually as second panels 122a-122g) positioned at least proximate to the first panels 121. As described in detail below, the first panels 121 can include a phase change material (PCM). For example, in one embodiment, the first panels 121 can include a wax-based PCM configured to undergo a solid-to-liquid phase transition (i.e., melt) at an at least approximately constant temperature. In other embodiments, the first panels 121 can include other types of PCMs configured to undergo other types of phase transitions. For example, in another embodiment, the first panels 121 can include a PCM configured to undergo a solid-to-gas phase transition. In a further embodiment, the first panels 121 can include a PCM configured to undergo a liquid-to-gas phase transition.

As further described in detail below, the second panels 122 can include an insulating material. For example, the second panels 122 can include a foam core in a sealed envelope. In one embodiment, the envelope can be evacuated to create an evacuated region in the second panel 122.

In the illustrated embodiment, the first panels 121 and the second panels 122 are sandwiched together between the inner shell 110 and the outer shell 102 with the first panels 121 being inboard of the second panels 122. In other embodiments, the first panels 121 and the second panels 122 can have other relative positions. For example, in one other embodiment, the second panels 122 can be positioned inboard of the first panels 121. In another embodiment, the second panels 122 can be incorporated into an exterior portion of the outer shell 102 and/or spaced apart from the first panels 121. In a further embodiment, either or both of the first panels 121 and the second panels 122 can placed around the interior portion 106 in a staggered or irregular pattern, instead of the continuous encasement-type configuration illustrated in FIG. 1.

In a further aspect of this embodiment, the food storage unit 100 also includes a door 130 hingebly attached to the body 101. The door 130 can be movable between an open position as illustrated in FIG. 1 and a closed position in which it at least partially covers the aperture 103. In other embodiments, the food storage unit 100 can include at least a second door (not shown) providing access to the interior portion 106 from another side of the body 101. A seal 126 (partially cut-away in FIG. 1 for purposes of clarity) can extend at least partially around the aperture 103 and can be at least partially compressed by the door 130 when the door 130 is in the closed position. In another embodiment, the seal 126 can be attached to the door 130 or the seal 126 can be omitted.

Like the body 101, the door 130 can also include insulation. For example, in the illustrated embodiment, the door 130 includes a first door panel 131 positioned at least proximate to a second door panel 132. The first door panel 131 and the second door panel 132 can be at least generally similar in structure and function to the first panels 121 and the second panels 122, respectively, in the body 101. In other embodiments, the door 130 can include other types of insulation. Alternatively, in further embodiments, all or some of the door insulation can be omitted if not required to maintain the reduced temperatures desired in the interior portion 106.

In yet another aspect of this embodiment, the food storage unit 100 further includes a temperature information unit 140 positioned on the body 101 and operably coupled to the interior portion 106. The temperature information unit 140 can include a temperature sensing device 142 configured to provide an indication, such as a visual and/or audible signal, when the temperature in the interior portion 106 reaches a preselected temperature. In one embodiment, the temperature sensing device 142 can be configured to provide a signal when the temperature in the interior portion 106 reaches a preselected temperature from about 40° F. to about 45° F. (e.g., about 45° F.). In another embodiment, the temperature sensing device 142 can include a bimetallic sensing device, such as a thermostat. In a further embodiment, the temperature sensing device 142 can include a thermometer that provides an analog or a digital temperature reading. In yet another embodiment described in greater detail below, the temperature sensing device 142 can include a thermochromatic element that changes color when the temperature in the interior portion 106 reaches the preselected temperature.

Thus, the temperature sensing device 142 can provide an indication in a number of different ways when the temperature in the interior portion 106 reaches a preselected temperature. For example, in one embodiment, the temperature sensing device 142 can provide a signal, such as an audible or visual signal. In another embodiment, the temperature sensing device 142 can include an analog or digital thermometer with an associated dial or scale. In this embodiment, the indication provided by the temperature sensing device 142 can be the dial or scale registering a particular reading.

Figure 2:
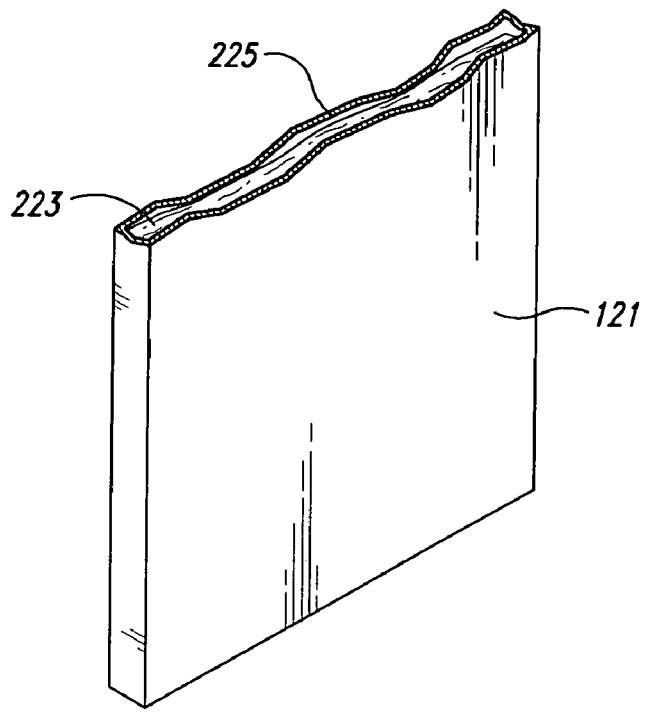
FIG. 2 is a partially cut away, enlarged isometric view of a first panel of the food storage unit of FIG. 1, configured in accordance with an embodiment of the invention.

FIG. 2 is a partially cut away, enlarged isometric view of one of the first panels 121 of FIG. 1 configured in accordance with an embodiment of the invention. In one aspect of this embodiment, the first panel 121 can include a PCM 223 contained within an outer liner 225. In one embodiment, the outer liner 225 can include plastic or another suitably impermeable material. In another embodiment, the PCM 223 can include a wax resin, such as a paraffin wax/polyethylene glycol mixture. In other embodiments, other types of PCM can be used depending on such factors as the desired transition temperature, thermal energy absorption properties, cost, and weight.

Figure 3:
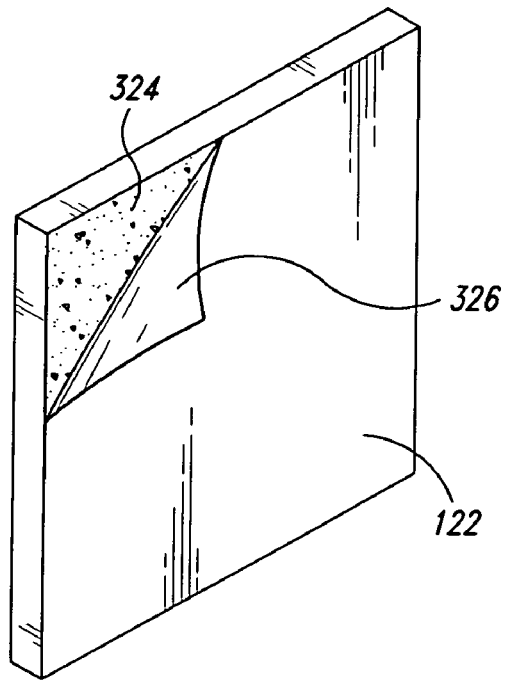
FIG. 3 is a partially assembled, enlarged isometric view of a second panel of the food storage unit of FIG. 1, configured in accordance with an embodiment of the invention.

FIG. 3 is a partially assembled, enlarged isometric view of one of the second panels 122 of FIG. 1 configured in accordance with an embodiment of the invention. In one aspect of this embodiment, the second panel 122 includes an outer film 326 (shown peeled back in FIG. 3) at least partially covering an inner core 324. The core 324 can include a plurality of hollow cavities to enhance the insulative properties of the second panel 122. For example, in one embodiment, the core 324 can include open cell foam, such as an open cell polyurethane foam. In another embodiment, the core 324 can include a closed-cell foam. In a further embodiment, the core 324 can include other materials forming a plurality of open cavities, such as honeycomb materials. The outer film 326 can include a flexible Mylar and/or plastic sheet sealed around the core 324. In one embodiment, the outer film 326 can also include a reflective finish to further enhance the insulative properties of the second panel 122. In another aspect of this embodiment, the plurality of cavities in the core 324 can be at least partially evacuated, and the outer film 326 can form an air-tight envelope around the evacuated core 324 resulting in a vacuum insulated panel. In other embodiments (for example, in those embodiments where less thermal insulation is required), the core 324 can remain non-evacuated. In further embodiments, the core 324 can remain non-evacuated and the outer film 326 can be omitted.

FIG. 4 is an enlarged cross-sectional view illustrating a method for removing one of the first panels 121 from the body 101 in accordance with an embodiment of the invention. The cross-sectional view illustrated in FIG. 4 is taken substantially along line 4-4 in FIG. 1, and shows a portion of the body 101 near the aperture 103 in the outer shell 102. In one aspect of this embodiment, the seal 126 is hingably attached to the body 101 at least proximate to the aperture 103. When the first panel 121 is fully installed in the body 101 between the food support structure 108 and the second panel 122, the seal 126 lays flat over edge portions of both the first panel 121 and the second panel 122. To remove the first panel 121, a user (not shown) pivots the seal 126 outwardly as shown in FIG. 4 to gain access to an edge portion of the first panel 121. Next, the user can grasp the edge portion of the first panel 121 and pull the first panel 121 out and away from the body 101. In one embodiment, the first panel 121 can include lanyards (not shown) or other features for this purpose. Once removed, the first panel 121 can be placed in a freezer or otherwise chilled to solidify the PCM material enclosed within. With the seal 126 pulled out of the way, the first panel 121 can then be slid back into position in the body 101 between the food support structure 108 and the second panel 122. Although the foregoing procedure is described above for the first panel 121, in another embodiment, a similar procedure can be used to change out the second panel 122 in the event the second panel 122 becomes damaged during use or otherwise needs to be removed. Similar procedures can be used to extract all of the other first panels 121 and/or the second panels 122 illustrated in FIG. 1.

With reference to FIGS. 1-4 collectively, the food storage unit 100 can be used in one embodiment as follows. First, the first panels 121 are recharged to lower their temperature. Here, the term "recharge" includes chilling the first panels 121 to a temperature sufficient to cause the PCM in the first panels 121 to transition from a first state, such as a liquid state, to a second state, such as a solid state (i.e., to freeze). For example, if the PCM has a melting point somewhere between 35° F. and 40° F., then the first panels 121 can be chilled at a temperature below 35° F., for example, from about 30° F. to about 32° F. Once frozen, the PCM in the first panels 121 will absorb heat at a constant temperature until all of the PCM in the panels 121 has transitioned from the solid state to a liquid state. In another embodiment, the PCM can transition from a solid state to a gaseous state as it absorbs heat. In one embodiment, the first panels 121 can be removed from the body 101 as shown in FIG. 4 for recharging, and then reinstalled after they have been recharged. In another embodiment, the first panels 121 can be recharged in situ by placing the food storage unit 100 in a refrigerated compartment. In a further embodiment, the first panels 121 can be non-removable from the body 101, in which case the first panels 121 must be recharged by cooling in the food storage unit 100.

Once the first panels 121 have been recharged and installed in the body 101, a plurality of chilled airline meals can be installed in the interior portion 106 on the horizontal supports 112, and the door 130 can be closed. In one embodiment, these operations can be performed by a caterer. Prior to loading the food storage unit 100 on an aircraft, the temperature information unit 140 can be inspected to ensure that the temperature of the interior portion 106 has not reached or exceeded a preselected level. If the temperature is satisfactory, then the caterer transports the loaded food storage unit 100 to an aircraft and loads it into a galley of the aircraft.

Prior to serving the meals, a flight attendant can inspect the temperature information unit 140 to ensure that the temperature of the interior portion 106 has not reached or exceeded the preselected level. For example, in one embodiment, the temperature information 140 can be configured to provide an indication, such as a visual and/or audible signal, if the interior portion 106 reaches or exceeds 45° F. If the interior portion 106 of the food storage unit 100 has not reached or exceeded the preselected temperature, then the flight attendant can serve the meals to passengers. Conversely, if the temperature sensor 140 indicates that the internal temperature has reached or exceeded 45° F., then the flight attendant may elect not to serve the meals. Alternatively, if regulations permit, the flight attendant may elect to rechill the meals by introducing chilled air into the cold air inlet 105 from an aircraft chilled-air refrigeration system, if such a system is available on the particular aircraft.

One advantage of the food storage unit 100 over conventional aircraft galley carts is that an onboard chilled-air refrigeration system is not required to maintain meals at a reduced temperature during flight. Instead, the combination of the first panels 121 and the second panels 122 provides enough insulation and/or cooling to maintain the meals at or below the preselected temperature without additional chilled-air from an onboard system. Another advantage of the food storage unit 100 over conventional aircraft galley carts is provided by the temperature information unit 140. The temperature information unit 140 provides a means for flight attendants to accurately monitor the temperature of the interior portion 106 of the food storage unit 100. In this way, the flight attendants can avoid serving meals that exceed, for example, the maximum allowable temperature of 45° F. mandated by the USPHS.

FIGS. 5A and 5B are enlarged front views of temperature information units 540a and 540b, respectively, configured in accordance with embodiments of the invention for use with food storage units, such as the food storage unit 100 of FIG. 1. Referring first to FIG. 5A, the temperature information unit 540a can include a thermochromatic temperature sensor 542 positioned on a base portion 544. In one aspect of this embodiment, the base portion 544 can include a flexible substrate configured to at least temporarily adhere to a portion of the food storage unit, such as a window portion 550 positioned on a door portion 530. In other embodiments, the base portion 544 can be configured to attach and/or mount to other portions of the food storage unit.

In another aspect of this embodiment, the thermochromatic temperature sensor 542 can be configured to change color when the internal temperature of the food storage unit reaches a preselected temperature. For example, in one embodiment, the thermochromatic temperature sensor 542 can have a blue color when the internal temperature is below 45° F., but can change to red if and when the internal temperature reaches or exceeds 45° F. In other embodiments, the thermochromatic temperature sensor 542 can be configured to change one or more other colors to signify achieving one or more internal temperature levels.

In a further aspect of this embodiment, the temperature information unit 540a can also include a text portion 562 positioned on the base portion 544. The text portion 562 can include information relating to the contents of the food storage unit. For example, in one embodiment, the text portion 562 can include information identifying the caterer, the food lot, and/or the date and time of day that the food was stored in the food storage unit. In other embodiments, the text portion 562 can include other information, such as the initial temperature of the food stored in the food storage unit. As mentioned above, in one embodiment, the base portion 544 can include be configured to temporarily adhere to the window portion 550. Accordingly, this feature enables the temperature information unit 540a to be removed and replaced after each time the food storage unit is used with a new temperature information unit having updated information.

Referring next to FIG. 5B, in one aspect of this embodiment, the temperature information unit 540b includes a thermometer facsimile having a graphical representation of a temperature scale 564 positioned adjacent to a temperature bar 568. As the temperature in the interior portion of the food storage unit changes, an end of the temperature bar 568 can move up or down the temperature scale 564 to reflect the internal temperature. In one embodiment, movement of the temperature bar 568 can be implemented by a thermochromatic medium. In other embodiments, other types of thermometers, including conventional mercury and digital thermometers, can be used in place of the thermochromatic version described above.

Figure 6:
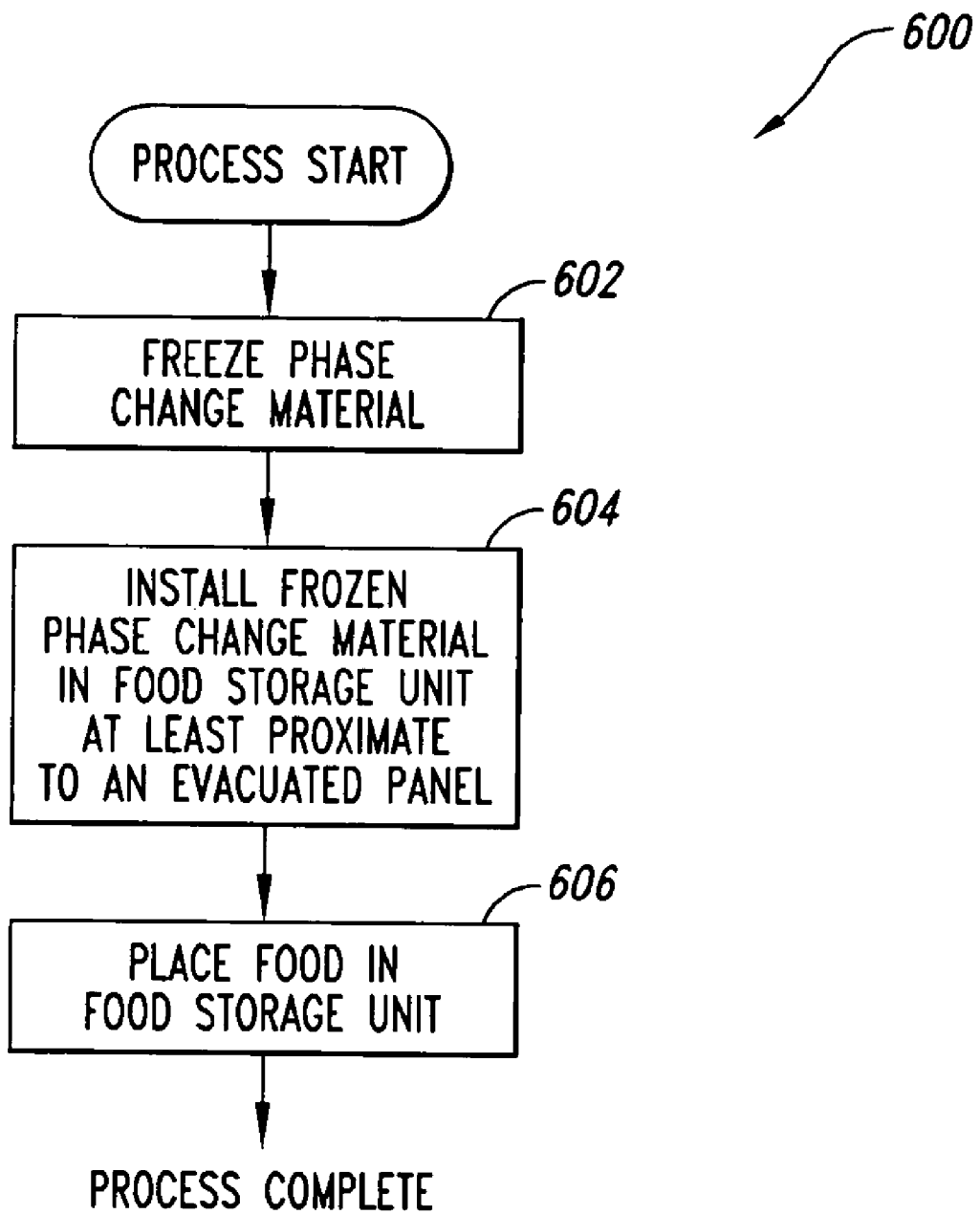
FIG. 6 is a flow diagram illustrating a method for preparing a food storage unit, such as the food storage unit of FIG. 1, in accordance with an embodiment of the invention.

FIG. 6 is a flow diagram illustrating a method 600 for preparing a food storage unit in accordance with an embodiment of the invention. In one aspect of this embodiment, the method 600 can be implemented with the food storage unit 100 described above with reference to FIGS. 1-4. In other embodiments, the method 600 can be implemented with other food storage units that utilize PCMs. In block 602, a caterer or other user freezes PCM, or a panel in which PCM is contained. In block 604, the caterer installs the frozen PCM in the food storage unit at least proximate to an evacuated panel. In block 606, the caterer places food, such as airline meals, in the food storage unit and the process is complete.

Figure 7:
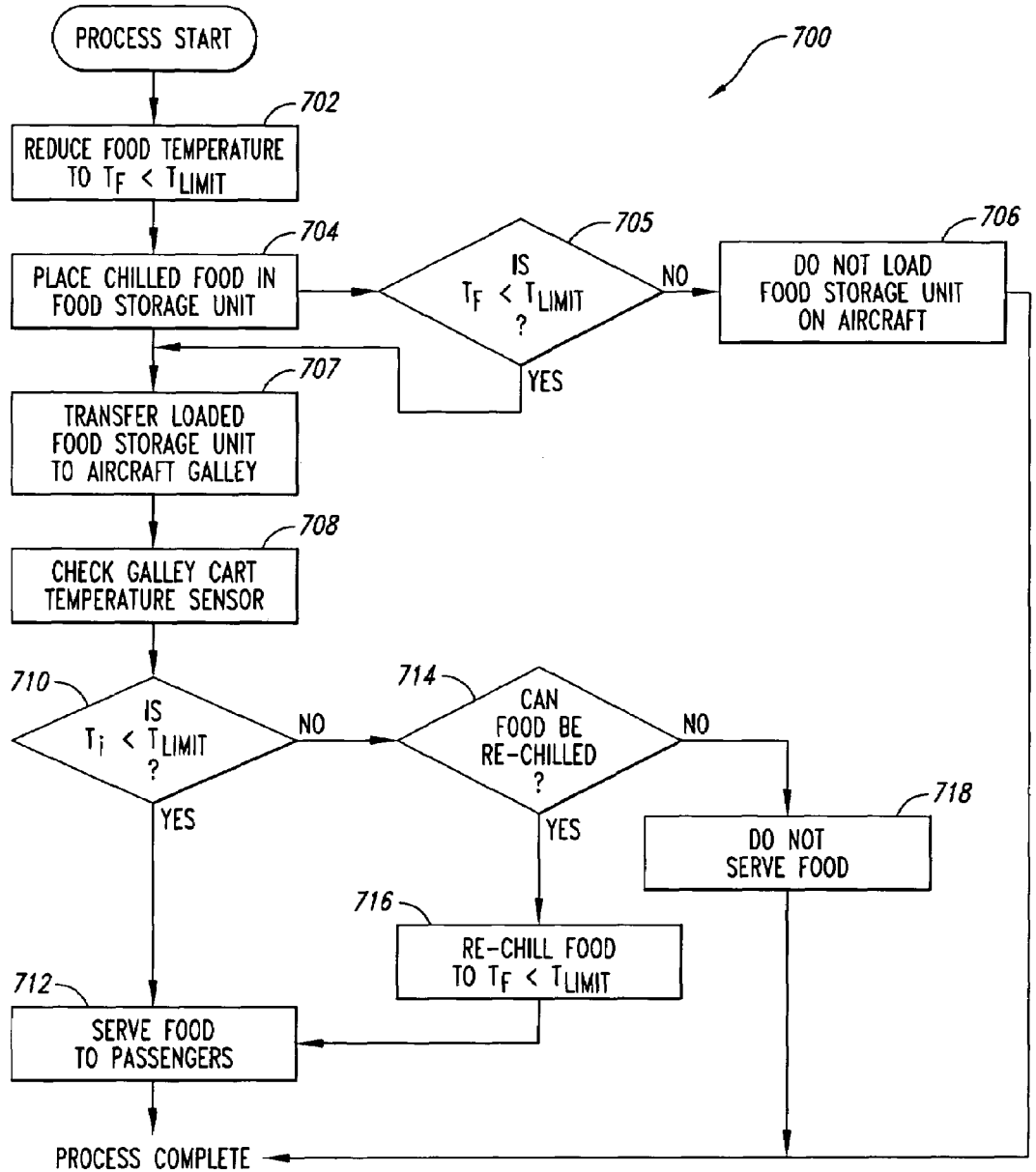
FIG. 7 is a flow diagram illustrating a method for using a food storage unit, such as the food storage unit of FIG. 1, in accordance with an embodiment of the invention.

FIG. 7 is a flow diagram illustrating a method 700 for using a food storage unit in accordance with an embodiment of the invention. In one aspect of this embodiment, the method 700 can be implemented with the food storage unit 100 described above with reference to FIGS. 1-4. In other embodiments, the method 700 can be implemented with other food storage units that include an internal temperature sensor. In block 702, a caterer or other user chills food after preparation to a temperature, $T_F$, that is less than a maximum allowable temperature, $T_{limit}$. In block 704, the caterer places the chilled food in the food storage unit. In decision block 705, the caterer checks the temperature sensor on the food storage unit to ensure that the temperature of the food is still below $T_{limit}$. If the temperature is not below $T_{limit}$, then in block 706 the caterer does not load the food storage unit on an aircraft. If the temperature is less than $T_{limit}$, then in block 707 the caterer transfers the loaded food storage unit to an aircraft, and loads the food storage unit in a galley of the aircraft.

In block 708, prior to serving the meals, a flight attendant or other user checks the temperature sensor on the food storage unit. In decision block 710, if the temperature sensor indicates that the internal temperature of the food storage unit, $T_i$, is less than the maximum allowable temperature, $T_{limit}$, then, in block 712, the flight attendant serves the meals to passengers on the aircraft. Alternatively, if $T_i$ is equal to or greater than $T_{limit}$, then in decision block 714 the flight attendant determines if the meals can be re-chilled to an acceptable temperature below $T_{limit}$. If the meals cannot be re-chilled (for example, if re-chilling is not allowed by the USPHS or if an on-board air-chiller is not available) then, in block 718, the flight attendant does not serve the meals and the method is complete. If, however, the meals can be re-chilled, then in block 716 the flight attendant re-chills the meals (for example, using an onboard air-chiller if available), and in block 712, the flight attendant serves the re-chilled meals to the passengers.

From the foregoing, it will be appreciated that specific embodiments of the invention have been described herein for purposes of illustration, but that various modifications may be made without deviating from the spirit and scope of the invention. For example, although the food storage units described above have been described in the context of aircraft usage, in other embodiments, food storage units that include aspects of the present invention can be used in other food storage contexts. Accordingly, the invention is not limited except as by the appended claims.

We claim:

1. A food storage unit comprising:
an exterior wall forming an outer shell portion of the food storage unit;
an interior wall offset from the exterior wall to define a space therebetween, the interior wall defining an interior portion of the food storage unit;
a phase change material removably positioned in the space between the exterior wall and the interior wall;
an evacuated region positioned between the exterior wall and the phase change material;
a door rotatably movable between a closed position in which the door prevents access to the interior portion of the food storage unit and an open position in which the door provides access to the interior portion of the food storage unit; and
a movable seal that overlays an edge portion of the phase change material and is at least partially compressed by the door when the door is in the closed position, wherein a first portion of the movable seal is fixedly attached to the food storage
e unit proximate the exterior wall, and wherein a second portion of the movable seal is can be moved pivotally away from the edge portion of the phase change material to remove of the phase change material from the food storage unit.

2. The food storage unit of claim 1 wherein the phase change material is configured to undergo a phase transition at an at least approximately constant temperature.

3. The food storage unit of claim 1 wherein the phase change material is configured to undergo a solid-to-liquid phase transition at an at least approximately constant temperature.

4. The food storage unit of claim 1 wherein the phase change material is configured to undergo a solid-to-gas phase transition at an at least approximately constant temperature.

5. The food storage unit of claim 1 wherein the phase change material is configured to undergo a liquid-to-gas phase transition at an at least approximately constant temperature.

6. The food storage unit of claim 1 wherein the phase change material is configured to undergo a solid-to-liquid phase transition at an at least approximately constant temperature in the range from about 30° F. to about 45° F.

7. The food storage unit of claim 1 wherein the phase change material includes a wax-resin configured to undergo a solid-to-liquid phase transition at an at least approximately constant temperature.

8. The food storage unit of claim 1 wherein the evacuated region is included in a panel having a core portion in an evacuated envelope.

9. The food storage unit of claim 1 wherein the evacuated region is included in a panel having an open cell foam core portion in an evacuated envelope.

10. The food storage unit of claim 1, further comprising a temperature sensor operably coupled to the interior portion.

11. The food storage unit of claim 1, further comprising a temperature sensor operably coupled to the interior portion, wherein the temperature sensor is configured to provide an indication when the temperature in the interior portion reaches a preselected temperature.

12. The food storage unit of claim 1, further comprising a thermochromatic temperature sensor operably coupled to the interior portion, wherein the thermochromatic temperature sensor is configured to provide a visual indication when the temperature in the interior portion reaches a preselected temperature.

13. The food storage unit of claim 1, further comprising a temperature recorder operably coupled to the interior portion, wherein the temperature recorder is configured to record an indication when the temperature in the interior portion reaches a preselected temperature.

14. The food storage unit of claim 1, further comprising a thermochromatic temperature recorder operably coupled to the interior portion, wherein the thermochromatic temperature recorder is configured to record an indication when the temperature in the interior portion reaches a preselected temperature.

15. A food storage unit comprising:
at least one wall positioned adjacent to an interior portion;
a phase change material positioned at least proximate to the wall;
an evacuated region positioned at least proximate to the phase change material,
wherein the evacuated region is included in a panel having a honeycomb core portion in an evacuated envelope;
a door rotatably movable between a closed position in which the door prevents access to the interior portion and an open position in which the door provides access to the interior portion; and
a movable seal that overlays an edge portion of the phase change material and is at least partially compressed by the door when the door is in the closed position, wherein a first portion of the movable seal is fixedly attached to the food storage unit proximate the wall, and wherein a second portion of the movable seal can be moved pivotally away from the edge portion of the phase change material to remove of the phase change material from the food storage unit.

16. A food cart for use on an aircraft, the food cart comprising:
an outer shell forming an exterior wall of the food cart, wherein the outer shell includes an aperture;
an interior shell forming a food support structure positioned inside the outer shell;
a first panel removably positioned between food support structure and the outer shell, the first panel including a phase change material;
at least a second panel positioned at least proximate to the first panel, the second panel including a plurality of cavities;
a door positioned at least proximate to the aperture, wherein the door is movable between a closed position in which the door at least partially covers the aperture and an open position in which the door is at least partially displaced from the aperture to provide access to the food support structure; and
a seal hingebly attached at least proximate to the first panel, wherein the seal can be at least partially compressed by the door when the door is in the closed position, and wherein the seal further can pivot away from the first panel to remove the first panel from the food cart.

17. The food storage unit of claim 16 wherein the second panel includes foam material.

18. The food storage unit of claim 16 wherein at least a portion of the cavities of the second panel are at least partially evacuated.

19. The food cart of claim 16 wherein the second panel includes a core portion in an evacuated envelope.

20. The food cart of claim 16 wherein the first panel includes a phase change material configured to undergo a phase transition at an at least approximately constant temperature in a range from about 30° F. to about 45° F.

21. The food cart of claim 16 wherein the food support structure includes an inner shell, and wherein the first and second panels are sandwiched between the inner shell and the outer shell.

22. The food cart of claim 16 wherein the food support structure includes a plurality of shelves in a vertical arrangement, and wherein each of the shelves is configured to support a row of food trays.

23. The food cart of claim 16, wherein the outer shell further includes a window portion,
a thermochromatic temperature sensor operably coupled to the window portion, wherein the thermochromatic temperature sensor is configured to provide a visual indication when the temperature in the interior portion reaches a preselected temperature.

24. The food cart of claim 16, wherein the food cart further comprises:
a temperature sensor operably coupled to the door, wherein the temperature sensor is configured to provide a visual indication when the temperature in the interior portion reaches a preselected temperature.

25. The food cart of claim 16, wherein the food cart further comprises:
a window portion supported by the door; and
thermochromatic temperature sensor operably coupled to the window portion, wherein the thermochromatic temperature sensor is configured to provide a visual indication when the temperature in the interior portion reaches a preselected temperature.

26. A food storage unit for use on an aircraft, the food storage unit comprising:
an outer shell having an interior portion configured to hold food and an aperture configured to provide access to the interior portion;
a first panel positioned at least proximate to the interior portion, the first panel including a phase change material;
at least a second panel positioned at least proximate to the first panel, the second panel including an evacuated region;
a temperature sensor positioned at least proximate to the outer shell and operably coupled to the interior portion;

a door positioned at least proximate to the aperture, wherein the door is movable between a closed position in which the door at least partially covers the aperture and an open position in which the door is at least partially displaced from the aperture; and a seal hingebly attached at least proximate to the first panel, wherein the seal is at least partially compressed by the door when the door is in the closed position, and wherein the seal is further configured to pivot away from the first panel to remove at least the first panel from the food storage unit.

27. A method for storing food, the method comprising:

reducing the temperature of a phase change material to transition at least a portion of the phase change material from a first state to a second state;

installing the phase change material in a food storage unit at least proximate to an evacuated panel, wherein the food storage unit includes an inner shell forming a food support structure and an outer shell forming an exterior wall of the food storage unit, wherein the evacuated panel is positioned between the inner shell and the outer shell, and wherein installing the phase change material includes moving a compressible door seal hingeably attached to the evacuated panel away from the inner shell and inserting a phase change material panel between the inner shell and the outer shell adjacent to the evacuated panel;

placing food into the food storage unit at least proximate to the phase change material; and removing the phase change material panel from the food storage unit by pivotally moving the compressible door seal away from the inner shell and removing the phase change material panel from between the inner shell and the outer shell.

28. The method of claim 27 wherein installing the phase change material in a food storage unit includes installing a phase change material configured to undergo a solid-to-gas phase transition at an at least approximately constant temperature.

29. The method of claim 27 wherein installing the phase change material in a food storage unit includes installing a phase change material configured to undergo a solid-to-liquid phase transition at an at least approximately constant temperature in a range from about 30° F. to about 45° F.

30. The method of claim 27 wherein installing the phase change material in a food storage unit includes installing a wax-resin phase change material configured to undergo a solid-to-liquid phase transition at an at least approximately constant temperature.

31. The method of claim 27 wherein installing the phase change material in a food storage unit includes installing the phase change material at least proximate to an evacuated panel including open cell foam.

32. The method of claim 27, further comprising positioning the food storage unit in a galley of an aircraft.

33. The method of claim 27, further comprising positioning the food storage unit in a chilled compartment in a galley of an aircraft.

34. The method of claim 27, further comprising reducing the temperature of the food before placing the food into the food storage unit.

35. A system for storing food, the system comprising:

means for supporting food in an interior portion of an outer shell, wherein the outer shell forms an exterior wall portion of the system for storing food, and wherein the means for supporting food includes an inner shell that is offset from the outer shell to define a space therebetween, wherein the inner shell includes a plurality of shelves in a vertical arrangement, wherein each of the shelves is configured to support a row of food trays;

phase change means for changing phase from a first state to a second state at an at least approximately constant temperature, wherein the phase change means is removably positioned in the space between the inner shell and the outer shell;

evacuated means for insulating the interior portion, wherein the evacuated means is positioned in the space between the inner shell and the outer shell;

a door movable between a closed position in which the door prevents access to the food support structure and an open position in which the door provides access to the food support structure; and a seal hingebly attached at least proximate to the phase change means, wherein the seal can be at least partially compressed by the door when the door is in the closed position, and wherein the seal further can pivot away from the phase change means for removal of the phase change means from the space between the inner shell and the outer shell.

36. The system of claim 35, further comprising means for removing the phase change means from at least proximate the interior portion so the phase change means can be chilled separate from the interior portion.

37. A food cart for use on an aircraft, the food cart comprising:

an outer shell having an aperture;

a door positioned at least proximate to the aperture, wherein the door is movable between a closed position in which the door at least partially covers the aperture and an open position in which the door is at least partially displaced from the aperture to provide access to an interior portion of the food cart;

a first panel positioned adjacent to the outer shell, wherein the first panel includes a plurality of evacuated cavities;

a second panel removably positioned adjacent to the first panel, wherein the second panel includes a phase change material; and a door seal hingeably attached to the first panel, wherein the door seal can be at least partially compressed by the door when the door is in the closed position, and wherein the door seal further can move pivotally away from the second panel for removal of the second panel from the food cart.

38. The food cart of claim 37, further comprising an inner shell spaced apart from the outer shell to define a space therebetween, wherein the first and second panels at least approximately fill the space between the inner shell and the outer shell.

39. The food cart of claim 37, further comprising an inner shell having a plurality of food tray supports, wherein the first and second panels are sandwiched between the inner shell and the outer shell.

* * * * *